Patented Feb. 29, 1944

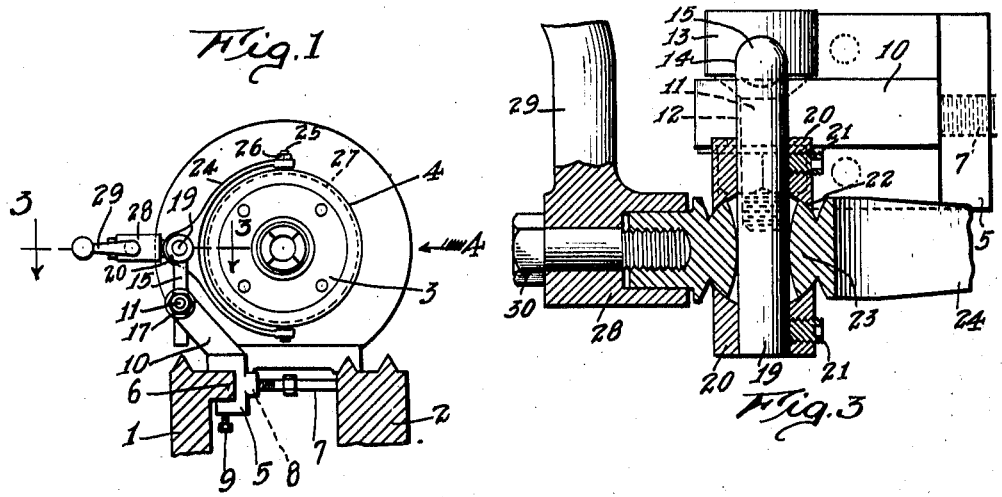
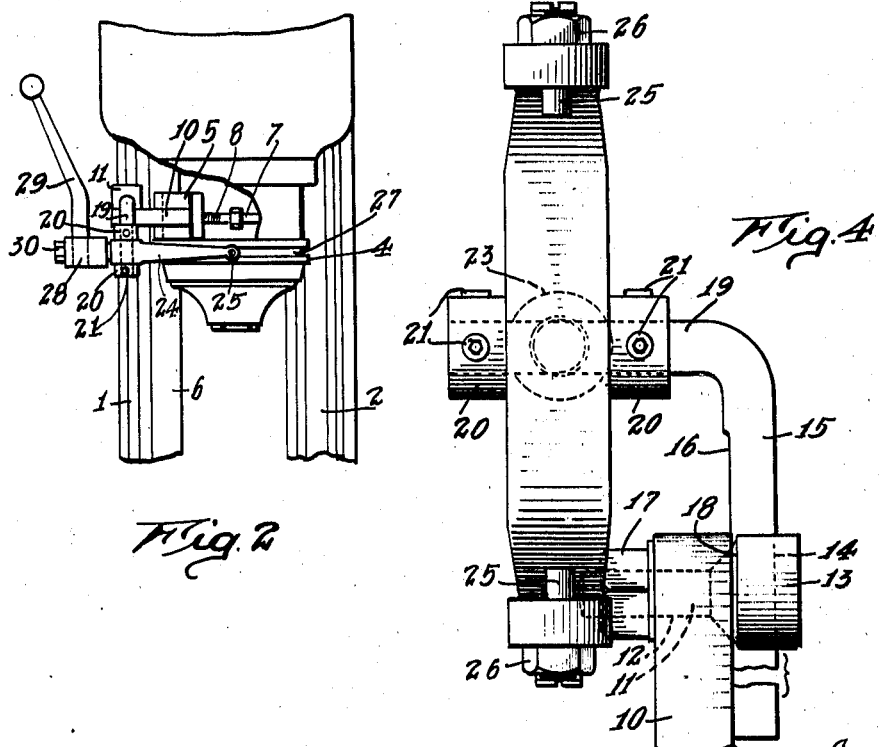

2,342,903

UNITED STATES PATENT OFFICE 2,342,903

LATHE ATTACHMENT

Knut R. Sjogren, Los Angeles, Calif.

Application August 17, 1942, Serial No. 455,089

3 Claims. (Cl. 279—1)

My invention relates to a lathe attachment and more particularly to an attachment for actuating the collet chuck described in my copending application Serial Number 428,217, filed January 26, 1942, now Patent No. 2,311,258, issued February 16, 1943.

My present invention consists of a bracket attached to the lathe bed for supporting adjustable lever means for operating the clutch ring of my collet chuck.

While the present invention is particularly adapted to actuate my collect chuck, it can be used to actuate any chuck or device used on a lathe which is actuated by a sliding motion, without departing from the spirit of my invention.

A lathe bed, to which my lathe attachment is adapted to be fastened, consists of two finely machined parallel steel supports. Any attachment fastened thereto must not distort or deface this bed and yet must be rigidly attached thereto.

As the center of rotation of the chuck is at different distances from the lathe bed on different lathes, my lathe attachment must be adjustable to compensate for this difference in distances.

It is, therefore, an object of my invention to produce a lathe attachment for actuating the collet chuck described in my aforementioned application.

Another object of my invention is to provide a lathe attachment which can be fastened to a lathe bed without distorting or defacing said lathe bed.

Another object of my invention is to provide a lathe attachment which is adjustable to different sizes and makes of lathes.

Other objects and advantages will be apparent from the following detailed description and drawing of the preferred embodiment of my invention.

In the drawing:

Fig. 1 is an end view;

Fig. 2 is a plan view;

Fig. 3 is a cross section taken on the line 3—3 of Fig. 1;

Fig. 4 is an enlarged view taken in the direction of the arrow 4 on Fig. 1, with the chuck of Fig. 1 removed.

In Fig. 1 is shown my invention attached to the steel supports 1 and 2 comprising a lathe bed. The collet chuck to be actuated is shown at 3 and has the sliding clutch ring 4.

To fasten my attachment to the supports 1 and 2, I provide a U shaped bracket 5 which is adapted to fit over a projection 6 on the support 1 and is held thereon by a bolt 7 attached to the U bracket 5 by the threads 8. The outer end of the bolt 7 engages the support 2 and holds the U bracket 5 against the projection 6. As the distance between lathe supports 1 and 2 on different lathes varies and it is not desirable to permanently attach my invention to the lathe, the distance between the supports 1 and 2 can be adjusted by screwing the bolt 7 in and out of the bracket 5 by the threads 8.

To securely hold my attachment from longitudinal movement on the support 1, I provide the set screw 9 which can be tightened against the projection 6 to firmly clamp the bracket 5 thereon.

It should be noted that the bolt 7 should merely rest firmly against the support 2 and thus prevent lateral movement of the bracket 5 and not be screwed up tightly as this will spread the supports 1 and 2 and distort their parallelism. The bolt 7 only prevents lateral movement and the set screw 9 maintains the bracket 5 from longitudinal movement and from chatter.

Cast integrally with the bracket 5, or bolted thereon, is a hanger 10 carrying at its outer end a bolt 11 slidably and rotatably mounted in the hole 12. Through the head 13 of the bolt 11 is a hole 14 for the reception of an arm 15. I prefer to make the hole 14 circular and the arm 15 circular to form a sliding fit therein but both could be square or rectangular. To prevent rotation of the arm 15 in the hole 14, a flat 16 is provided. When the bolt 11 is tightened in the hole 12 by means of the threadably attached nut 17 the flat 16 is drawn against the surface 18 of the hanger 10 and rotation is prevented.

By the proper adjustment of the angle of the arm 15 and the distance it extends from the bolt 11, the hanger 10 and the arm 15 can be made to fit any lathe regardless of the distance from the lathe bed to the center of rotation of the chuck. By loosening the nut 17, the arm 15 can be slid in or out of the hole 14 to any desired position and the bolt 11 may be rotated to change the angle.

The arm 15 has a right angle bend making an extension 19 upon which two collars 20 are fastened by set screws 21. The collars 20 have their adjacent surfaces socket shaped as at 22 for the reception of the ball 23 carried by the clevis 24. The ball 23 is free to rotate in the sockets 22 and the play in this ball and socket joint can be adjusted by the moving of either of the collars 20 on the extension 19.

The clevis 24 which is rotatable in the ball and socket joint carries on each arm pins 25 threaded therein and locked in place by the lock nuts 26. The pins 25 engage in the slot 27 in the clutch ring 4 of the chuck 3. Movement of the clevis in the ball and socket causes the clutch ring 4 to move. I provide an extension 28 on the clevis 24 upon which is journaled a lever 29 for rotating the clevis.

To permit the lever 29 to be placed in a convenient position and not in the way of the lathe operator, it is rotatable to any position on the extension 28 and can be fixed in the desired position by tightening the bolt 30 threaded in the extension 28.

Movement of the lever 29 will rotate the clevis 24 on the ball and socket and this motion will be transmitted by the pins 25 to the clutch ring 4 causing the clutch ring to slide upon the chuck 3 and thus operate the same.

While I have described the preferred embodiments of my invention, I am not limited to any details herein set forth except as described in the following claims:

I claim:

1. In a lathe attachment, a clevis for actuating a sliding clutch ring, a bracket for attaching to a lathe bed, a hanger carried by said bracket, an arm adjustably carried by said hanger, said arm being connected by a rotatable ball and socket joint to said clevis whereby said clevis can be rotated in said supporting socket and actuate said sliding clutch ring.

2. In a lathe attachment, a clevis for actuating a sliding clutch ring, a bracket for attaching to a lathe bed, a hanger carried by said bracket, an arm adjustably carried by said hanger, said arm being connected by a rotatable ball and socket joint to said clevis whereby said clevis can be rotated in said supporting socket and actuate said sliding clutch ring, and a lever for actuating said clevis.

3. In a lathe attachment, a clevis for actuating a sliding clutch ring, a bracket for attaching to a lathe bed, a hanger carried by said bracket, an arm adjustably carried by said hanger, said arm being connected by a rotatable ball and socket joint to said clevis whereby said clevis can be rotated in said supporting socket and actuate said sliding clutch ring, and a lever adjustable in position for actuating said clevis.

KNUT R. SJOGREN.